United States Patent [19]

Inoue et al.

[11] Patent Number: 4,830,467

[45] Date of Patent: May 16, 1989

[54] A DRIVING SIGNAL GENERATING UNIT HAVING FIRST AND SECOND VOLTAGE GENERATORS FOR SELECTIVELY OUTPUTTING A FIRST VOLTAGE SIGNAL AND A SECOND VOLTAGE SIGNAL

[75] Inventors: Hiroshi Inoue, Yokohama; Yoshiyuki Osada, Atsugi; Yutaka Inaba, Kawaguchi, all of Japan

[73] Assignee: Canon Kabushiki Kaisha, Tokyo, Japan

[21] Appl. No.: 13,112

[22] Filed: Feb. 10, 1987

[30] Foreign Application Priority Data

Feb. 12, 1986 [JP] Japan ................................ 61-28151
Feb. 18, 1986 [JP] Japan ................................ 61-34730

[51] Int. Cl.[4] ........................ G02F 1/133; G09G 3/36

[52] U.S. Cl. ................................ 350/333; 350/350 S; 350/332; 340/805

[58] Field of Search .................... 350/332, 333, 350 S; 340/784, 805, 718, 719, 811; 357/23.7

[56] References Cited

U.S. PATENT DOCUMENTS

| | | | |
|---|---|---|---|
| 3,862,360 | 1/1975 | Dill et al. | 350/332 |
| 4,380,008 | 4/1983 | Kawakami et al. | 340/784 |
| 4,395,709 | 7/1983 | Nagae et al. | 340/784 |
| 4,542,301 | 9/1985 | Narabu | 377/79 |
| 4,600,274 | 7/1986 | Morozumi | 340/784 |
| 4,642,628 | 2/1987 | Murata | 340/784 |
| 4,702,560 | 10/1987 | Endo et al. | 340/784 |

FOREIGN PATENT DOCUMENTS

| | | | |
|---|---|---|---|
| 0190738 | 8/1986 | European Pat. Off. | 350/332 |
| 0156046 | 8/1985 | Japan | 350/332 |
| 1070532 | 4/1986 | Japan | 350/332 |
| 2102176 | 1/1983 | United Kingdom | 350/332 |

OTHER PUBLICATIONS

A. I. Lakatos–"Promise and Challenge . . . Active Matrices", pp. 185–192–Proceedings of the SID, vol. 2412–1983.

K. Kasahara–"A LC–TV Display . . . Bus Drivers", pp. 96–101–1980 Biennial Display Research Conference–IEEE–1980.

*Primary Examiner*—Stanley D. Miller
*Assistant Examiner*—Tai V. Duong
*Attorney, Agent, or Firm*—Fitzpatrick, Cella, Harper & Scinto

[57] ABSTRACT

A driving apparatus including a scanning driver circuit connected to scanning electrodes and a signal driver circuit connected to signal electrodes. The signal driver circuit includes (1) a drive signal generating unit which includes a first signal generating circuit and a second signal generating circuit for generating a first voltage signal and a second voltage signal, respectively, of mutually different waveforms, (2) a switching circuit unit for selectively supplying the first or second voltage signal to a signal electrode, and (3) a switching signal generating unit for supplying a switching control signal to the switching circuit unit.

57 Claims, 13 Drawing Sheets

A DRIVING SIGNAL GENERATING UNIT HAVING FIRST AND SECOND VOLTAGE GENERATORS FOR SELECTIVELY OUTPUTTING A FIRST VOLTAGE SIGNAL AND A SECOND VOLTAGE SIGNAL

FIELD OF THE INVENTION AND RELATED ART

The present invention relates to a driving apparatus for an optical modulation device of the type wherein a contrast is discriminated depending on an applied electric field, particularly a ferroelectric liquid crystal device.

Flat panel display devices have been and are being actively developed all over the world. Among these, a display device using liquid crystal has been fully accepted in small scale commercial use. However, it has been very difficult to develop a display device which has such a high resolution and a large picture area that it can substitute for a CRT (cathode ray tube) by means of a conventional liquid crystal system, e.g., those using a TN (twisted nematic) or DS (dynamic scattering) mode.

In order to overcome drawbacks with such prior art liquid crystal devices, the use of a liquid crystal device having bistability has been proposed by Clark and Lagerwall (e.g., Japanese Laid-Open Patent Application No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, bistable devices different from optical modulation devices in which the above-mentioned TN-type liquid crystals are used, because the bistable liquid crystal molecules are oriented to first and second optically stable states with respect to one and the other electric field vectors, respectively. The characteristics of the liquid crystals of this type are such that they are oriented to either of two stable states at an extremely high speed and the states are maintained when an electric field is not supplied thereto. By utilizing such properties, these liquid crystals having a chiral smectic phase can essentially eliminate a large number of problems involved in the prior art devices as described above.

In a ferroelectric liquid crystal device, switching may be effected by selectively applying a voltage signal of a positive polarity or a voltage signal of a negative polarity to individual pixels as disclosed in British Patent Specification GB-A2141279, so that writing signals applied to signal electrodes include both a positive polarity signal and a negative polarity signal in a single scanning phase.

As a result, a driving circuit for a ferroelectric liquid crystal device generally requires a complicated circuit structure when compared with a driving circuit for a conventional TN (twisted nematic) type liquid crystal device, so that it requires a large number of driver ICs (integrated circuits) and also a large number of connecting points between the ICs and the ferroelectric liquid crystal device. As a result, a driving circuit for a ferroelectric liquid crystal device is liable to be expensive.

SUMMARY OF THE INVENTION

An object of the present invention is to provide a driving apparatus having solved the above mentioned problems, particularly a driving apparatus with a simple circuit structure adapted for a ferroelectric liquid crystal device.

According to the present invention, there is provided a driving apparatus which comprises a scanning driver circuit connected to scanning electrodes and a signal driver circuit connected to signal electrodes; the signal driver circuit comprising:

(1) a drive signal generating unit which includes a first signal generating circuit and a second signal generating circuit for generating a first voltage signal and a second voltage signal, respectively, of mutually different waveforms;

(2) a switching circuit unit for selectively supplying the first or second voltage signal to a signal electrode; and (3) a switching signal generating unit for supplying a switching control signal to the switching circuit unit.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

An optical modulation material used in an optical modulation device to which the present invention may be suitably applied, may be a material capable of providing a discriminatable contrast by showing at least a first optically stable state (assumed to provide, e.g., a "bright" state) and a second optically stable state (assumed to provide, e.g., a "dark" state) depending on an electric field applied thereto, preferably a material showing bistability in response to an applied electric field, and particularly a liquid crystal showing such properties.

Preferable liquid crystals having bistability which can be used in the driving method according to the present invention are smectic, particularly chiral smectic, liquid crystals having ferroelectricity. Among them, chiral smectic C (SmC*)-, H (SmH*)-, I (SmI*)-, F (SmF*)- or G (SmC*)-phase liquid crystals are suitable therefor. These ferroelectric liquid crystals are described in, e.g., "LE JOURNAL DE PHYSIQUE LETTERS", 36 (L-69), 1975, "Ferroelectric Liquid Crystals"; "Applied Physics Letters" 36 (11), 1980, "Submicro Second Bistable Electrooptic Switching in Liquid Crystals", "Kotai Butsuri (Solid State Physics)" 16 (141), 1981, "Liquid Crystal", etc. Ferroelectric liquid crystals disclosed in these publications may be used in the present invention.

More particularly, examples of ferroelectric liquid crystal compound used in the method according to the present invention are decyloxybenzylidene-p'-amino-2-methylbutyl-cinnamate (DOBAMBC), hexyloxybenzylidene-p'-amino-2-chloropropylcinnamate (HOBACPC), 4-o-(2-methyl)-butylresorcylidene-4'-octylaniline (MBRA8), etc.

When a device is constituted by using these materials, the device may be supported with a block of copper, etc., in which a heater is embedded in order to realize a temperature condition where the liquid crystal compounds assume an SmC*-, SmH*-, SmI*-, SmF*or SmG*-phase.

Figure 13:
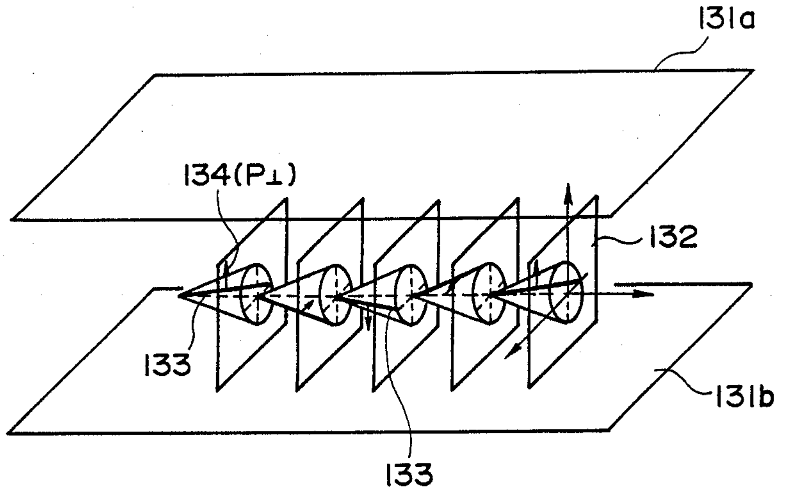
FIGS. 13 and 14 are schematic perspective views illustrating a ferroelectric liquid crystal device used in the present invention.
Figure 14:
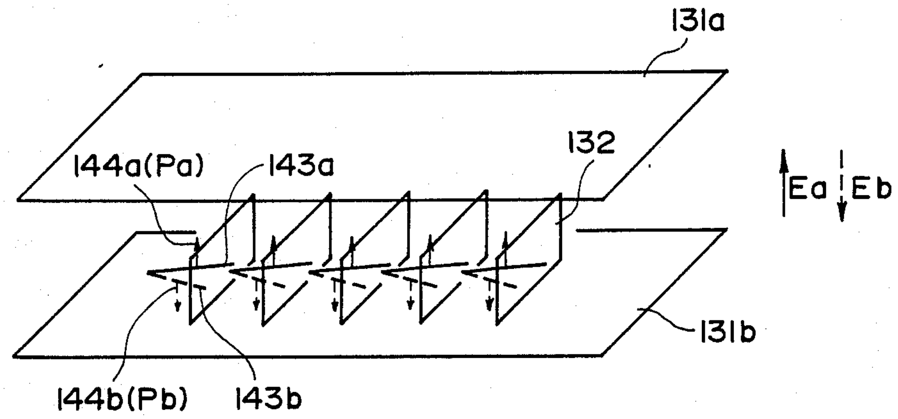

Referring to FIG. 13, there is schematically shown an example, of a ferroelectric liquid crystal cell. Reference numerals 131*a* and 131*b* denote substrates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layers 132 are oriented perpendicular to surfaces of the glass plates is hermetically disposed therebetween. A full line 133 shows liquid crystal molecules. Each liquid crystal molecule 133 has a dipole moment ($P\perp$) 132 in a direction perpendicular to the axis thereof. When a voltage higher than a certain threshold level is applied between electrodes formed on the substrates 131*a* and 131*b*, a helical structure of the liquid crystal molecule 133 is unwound or released to change the alignment direction of respective liquid crystal molecules 133 so that the dipole moments ($P\perp$) 134 are all directed in the direction of the electric field. The liquid crystal molecules 133 have an elongated shape and show refractive anisotropy between the long axis and the short axis thereof. Accordingly, it is easily understood that when, for instance, polarizers arranged in a cross nicol relationship, i.e., with their polarizing directions being crossing each other are disposed on the upper and the lower surfaces of the glass plates, the liquid crystal cell thus arranged functions as a liquid crystal optical modulation device of the optical characteristics of which vary depending upon the polarity of an applied voltage. Further, when the thickness of the liquid crystal cell is sufficiently thin (e.g., 1 micron), the helical structure of the liquid crystal molecules is unwound without application of an electric field whereby the dipole moment assumes either of the two states, i.e., Pa in an upper direction 144*a* or Pb in a lower direction 144*b* as shown in FIG. 14. When electric field Ea or Eb higher than a certain threshold level and different from each other in polarity as shown in FIG. 14 is applied to a cell having the above-mentioned characteristics, the dipole moment is directed either in the upper direction 144*a* or in the lower direction 144*b* depending on the vector of the electric field Ea or Eb. In correspondence with this, the liquid crystal molecules are oriented in either of a first stable state 143*a* (bright state) and a second stable state 143*b* (dark state).

When the above-mentioned ferroelectric liquid crystal is used as an optical modulation element, it is possible to obtain two advantages. First, the response speed is quite fast. Second, the orientation of the liquid crystal shows bistability. The second advantage will be further explained, e.g., with reference to FIG. 14. When the electric field Ea is applied to the liquid crystal molecules, they are oriented to the first stable state 143*a*. This state is stably retained even if the electric field is removed. On the other hand, when the electric field Eb having a direction opposite to that of the electric field Ea is applied thereto, the liquid crystal molecules are oriented to the second stable state 143*b*, whereby the directions of the molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 microns, particularly 1 to 5 microns. A liquid crystal-electrooptical device having a matrix electrode structure using a ferroelectric liquid crystal of the type as described above has been proposed, e.g., by Clark and Lagerwall in U.S. Pat. No. 4,367,924.

Figure 1:
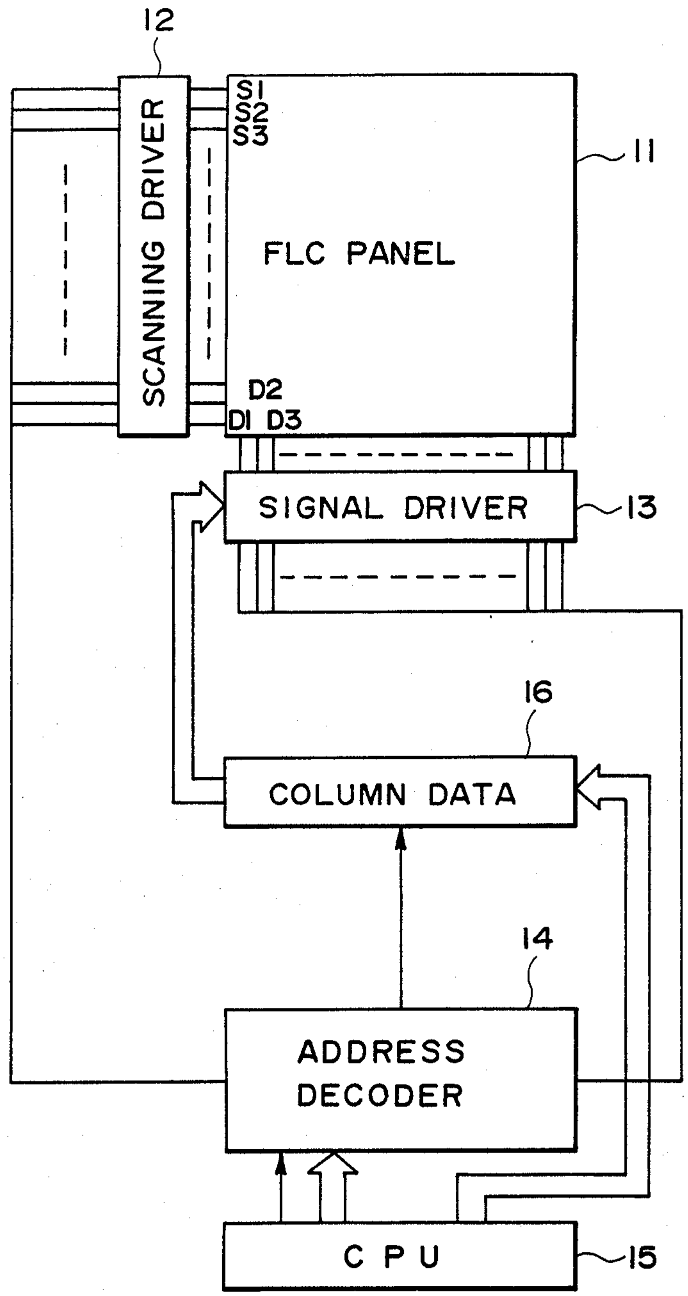
FIG. 1 is a block digram of a display apparatus to which the present invention is applicable.
Figure 3:
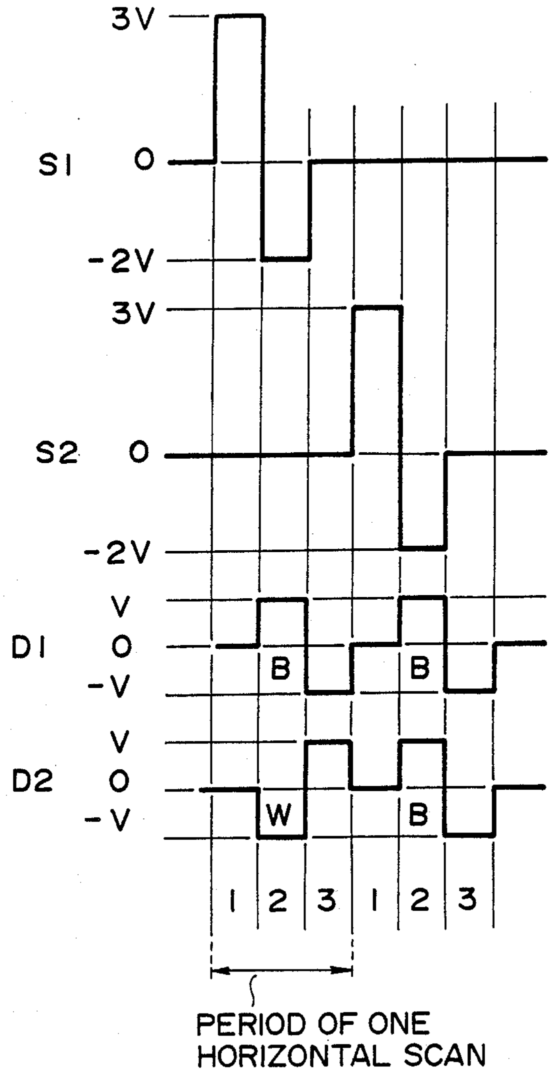
FIG. 3 illustrates signal waveforms applied to a ferroelectric liquid crystal panel.

FIG. 1 is a block diagram of a driving apparatus for a ferroelectric liquid crystal device (hereinafter, the term "ferroelectric liquid crystal" is sometimes abbreviated as "FLC"). More specifically, a driving unit for an FLC panel 11 comprises a scanning driver circuit 12 and a signal driver circuit 13. The scanning driver circuit 12 supplies scanning signals $S_1$, $S_2$, . . . , and the signal driver circuit 13 supplies data signals $D_1$, $D_2$, . . . , respectively as shown in FIG. 3. The addresses of the scanning driver circuit 12 and the signal driver circuit 13 are respectively determined by an address decoder 14. Further, column data 16 are governed by a CPU 15 and supplied to the signal driver circuit 13.

Figure 2:
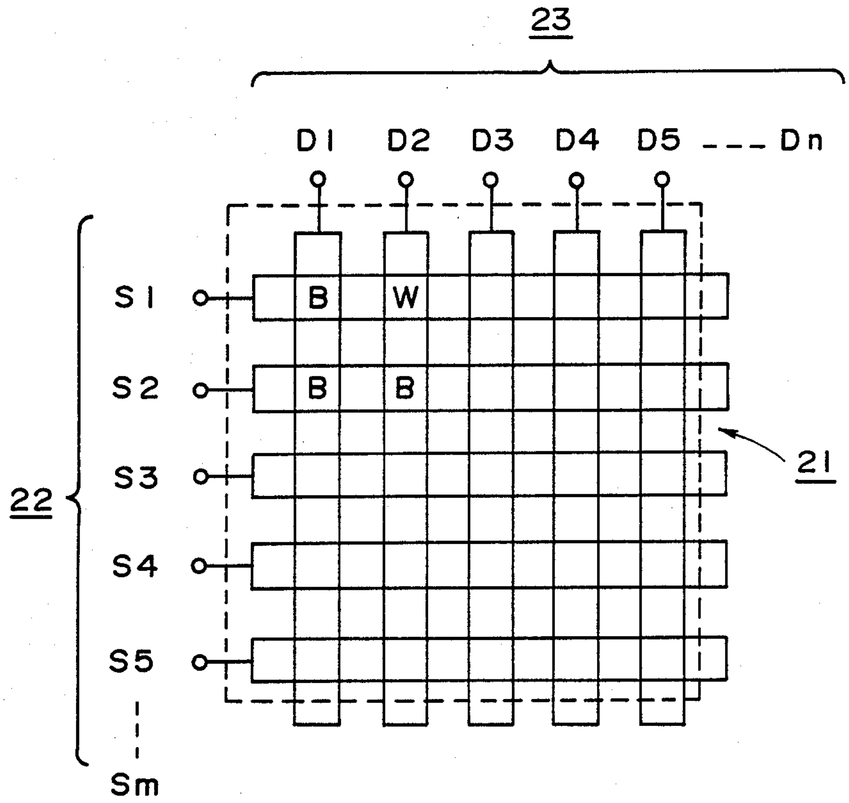
FIG. 2 is a schematic plan view of a ferroelectric liquid crystal panel.

FIG. 2 is a schematic plan view of a panel 21 having a matrix electrode comprising a number (m) of scanning electrodes 22 ($S_1$, . . . Sm) and a number (n) of signal electrodes 23 ($D_1$, . . . Dn) with a ferroelectric liquid crystal (not shown) as an optical modulation material sandwiched therebetween. The scanning electrodes 22 are sequentially selected in the order of $S_1$, $S_2$, $S_3$, . . . , Sm. Further, when a scanning electrode is selected, the signal electrodes 23 ($D_1$, . . . , Dn) are respectively supplied with signals corresponding to image data. FIG. 3 shows an example of a set of signals applied to electrodes $S_1$, $S_2$, $D_1$ and $D_2$ for providing a display state as shown in FIG. 2 wherein a pixel at an $S_1$-$D_1$ is displayed in "black" (denoted by "B" in the figure) based on the second stable state of the ferroelectric liquid crystal, a pixel at an $S_1$-$D_2$ intersection is displayed in "white" (denoted by "W" in the figure) based on the first stable state of the ferroelectric liquid crystal, and pixels at $S_2$-$D_1$ and $S_2$-$D_2$ intersections are both displayed in "black". As is clear from FIG. 3, in a period comprising phases 1-2-3, a black signal B and a white signal W are selectively applied to pixels on a selected scanning line $S_1$ at phase 2 to write in the pixels on the scanning line $S_1$. At phase 1, a voltage of 3 V exceeding the first threshold voltage $V_{th1}$ is applied to all the pixels on the scanning line $S_1$, whereby all the pixels are written in "white" based on the first stable state of the FLC. At phase 2, a pixel supplied with a black signal B is supplied with a voltage of −3 V exceeding the second threshold voltage $V_{th2}$ to be inverted into "black" based on the second stable state of the FLC, while a pixel supplied with a white signal W is supplied with a voltage of −V not exceeding the second threshold voltage $V_{th2}$ to retain the "white" display state resulting in the phase 1 as it is. Further, the signals of ±V applied at phase 3 are signals not changing the display states of the pixels written at the phase 2 and are used to prevent a crosstalk phenomenon which is caused by a data signal continuously applied to one pixel, e.g., in a case where a white signal W is continuously applied to one pixel through a signal electrode. In this instance, the signal applied at phase 3 is preferably one of a polarity opposite to that of the signal applied to the signal applied at phase 2 with respect to a reference potential.

As a result, the written states of one line of pixels are determined at the above mentioned phase 2, and by sequentially repeating the operation of phases 1-2-3 including the phase 2 row by row, writing of one whole picture is effected. In this instance, the voltage value V is set to satisfy the following relations with the first threshold voltage $V_{th1}$ for providing the first stable state (white) of the FLC and the second threshold voltage $V_{th2}$ for providing the second stable state (black) of the FLC, i.e., $3\ V > V_{th1} > V$ and $-3\ V < V_{th2} < -V$.

As described above, in the FLC panel, the "white" signal W (−V) and the "black" signal B (+V) with polarities different from each other are selectively applied to the signal electrodes 23 in a single scanning signal phase, i.e., phase 2. Hereinafter for brevity of explanation, the signal of +V and the signal of −V applied selectively to the signal electrodes at phase 2 are respectively referred to as a "black" signal and a "white" signal.

Figure 4:
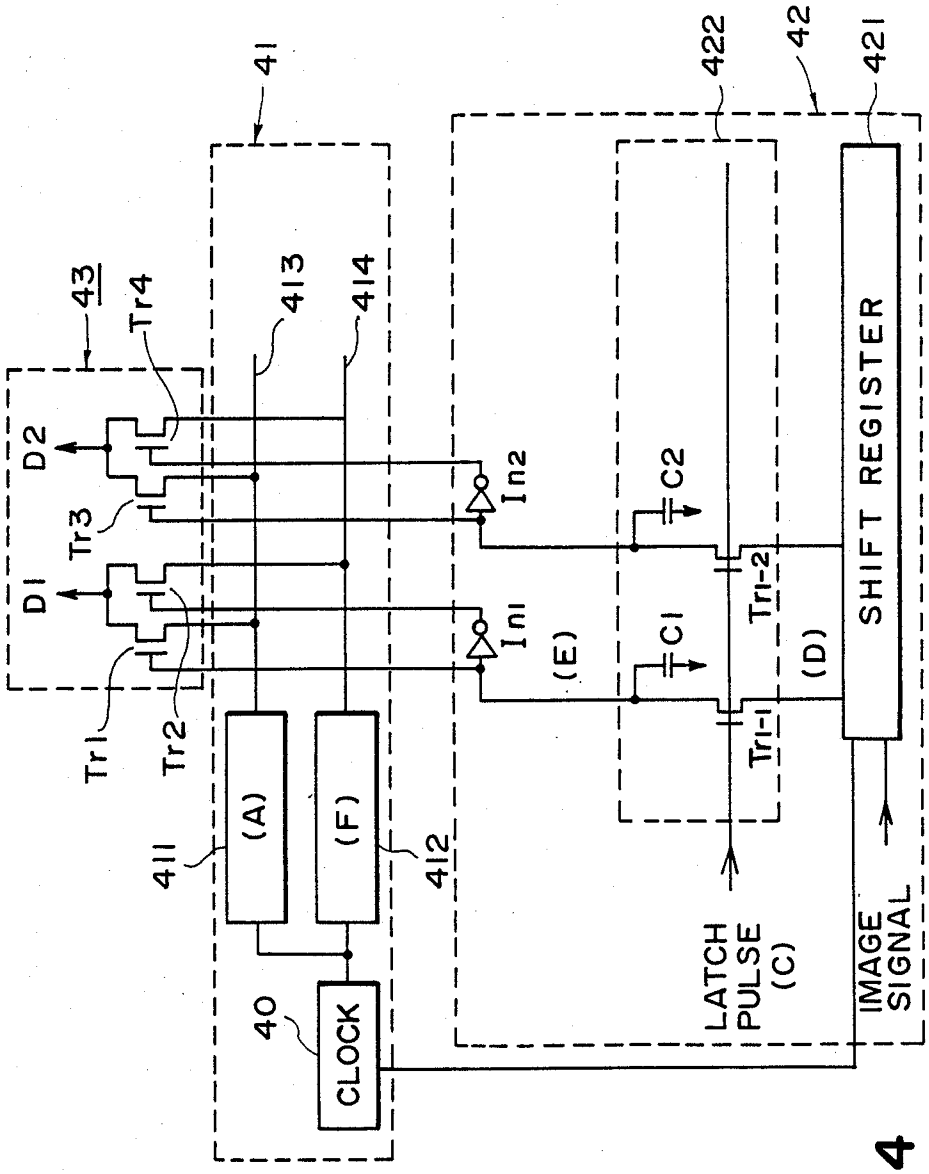
FIG. 4 is a block diagram illustrating a driving apparatus according to the invention.

FIG. 4 is a block diagram of a driving apparatus for generating the above mentioned data signals $D_1$, $D_2$, . . . The driving apparatus is provided with a drive signal generating unit 41 for generating a "white" signal W and a "black" signal B, a switching signal generating unit 42 for generating a timing signal for selecting either one of the white signal and the black signal depending on given data, and a switching circuit unit 43 for selecting a signal on a "white" bus 414 or a "black" bus 413 as a data signal.

Figure 7:
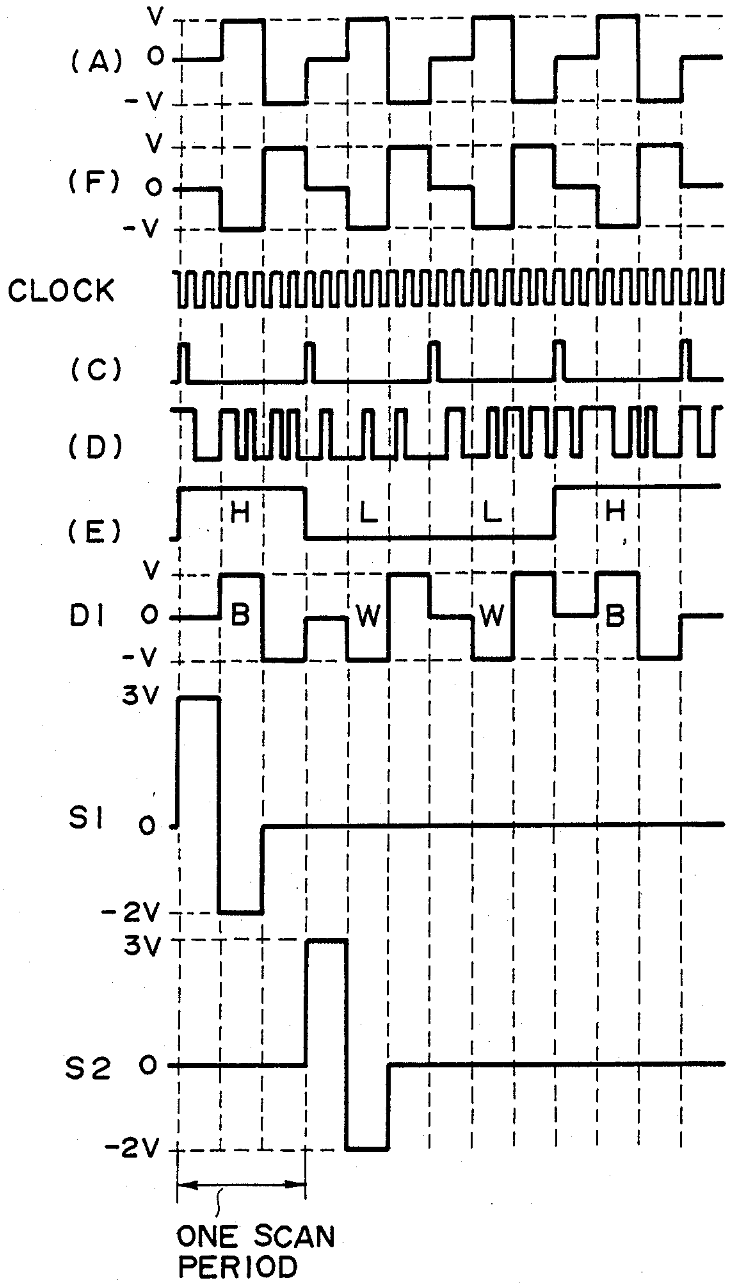
FIG. 7 is a time chart of signals used in a driving apparatus according to the invention.

The drive signal generating unit 41 includes a "black" signal generating unit 411 for generating a "black" signal waveform (A) shown at (A) in FIG. 7 and a "white" signal generating unit 412 for generating a "white" signal waveform (F) shown at (F) in FIG. 7, which are connected to the "black" bus 413 and the "white" bus 414, respectively. The two buses 413 and 414 are respectively connected to the switching circuit unit 43.

Figure 5:
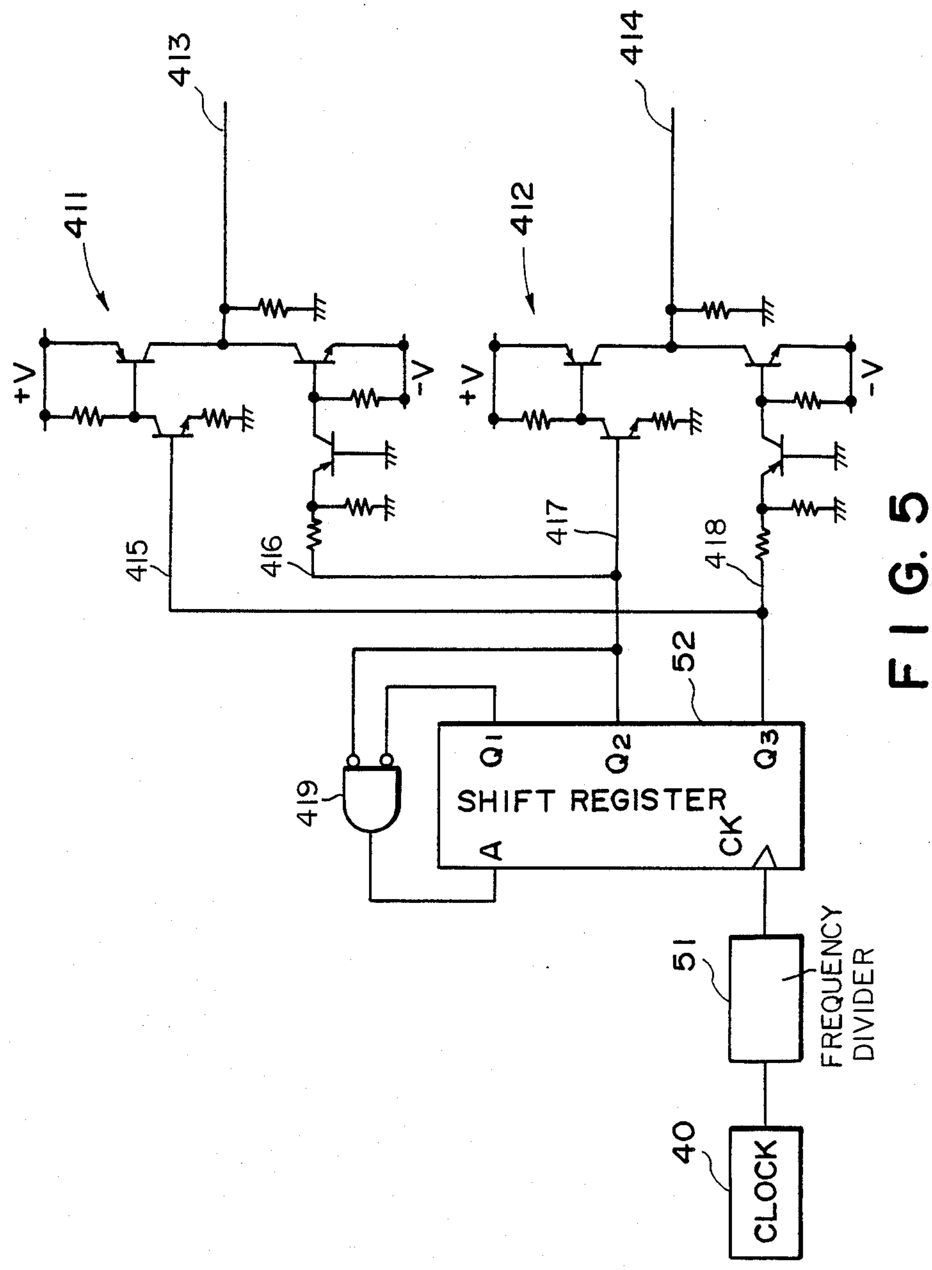
FIG. 5 illustrates a circuit of a drive signal generating unit used in a driving apparatus according to the invention.
Figure 6:
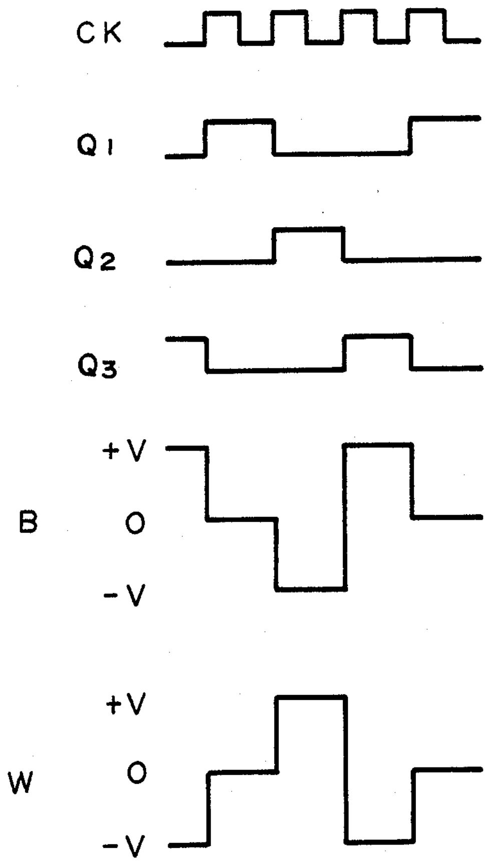
FIG. 6 is a time chart of signals generated thereby.

The circuit in FIG. 5 also comprises a clock 40, shift register 52, two sets of switching transistors and a frequency divider 51. FIG. 6 is the timing chart for the various signals of the circuit in FIG. 5.

The output of the clock 40 is first divided by frequency divider 51 to form signal CK which is supplied to the clock terminal of the shift register. The outputs of the shift register $Q_1$ and $Q_2$, are logically NANDed through a NAND gate 419 to form an input to terminal A of the shift register. In phase with the rising pulse edge of signal CK, the shift register supplies a data input signal to terminal A to shift register output $Q_1$, which in turn shifts to output $Q_2$ a signal which has previously been at $Q_1$, and shifts to output $Q_3$ a signal which has previously been at $Q_2$. Terminal A assumes a high level when outputs $Q_1$ and $Q_2$ are both at a low level. As a result, the outputs $Q_1$, $Q_2$ and $Q_3$ are sequentially-shifted as follows:

| | $Q_1$ | $Q_2$ | $Q_3$ |
|---|---|---|---|
| First Phase | HIGH | LOW | LOW |
| Second Phase | LOW | HIGH | LOW |
| Third Phase | LOW | LOW | HIGH |

Output $Q_2$ is supplied to the negative first voltage output signal generating circuit 416 and positive second voltage output signal generating circuit 417. Output $Q_3$ is supplied to the positive first voltage output signal generating circuit 415 and negative second voltage output signal generating circuit 418.

Both the first and second voltage outputs are set to zero during the first phase; the output level of the first voltage output is set to a negative level (−V) and that of the second voltage output is set to a positive level (+V) during the second phase; and the output level of the first voltage output is set to a positive level (+V) and that of the second voltage output is set to a negative level (−V) during the third phase.

In the switching (control) signal generating circuit 42, supplied image signals are subjected to serial-parallel conversion by means of a serial-parallel converter circuit such as a shift register 421 to provide data signals (D) for one scan line as shown at (D) in FIG. 7, which are sent to a buffer circuit such as a transfer gate 422. In the transfer gate 422, latch pulses (C) as shown at (C) in FIG. 7 are applied to respective transistors $Tr_{1-1}$, $Tr_{1-2}$, . . . , whereby the data signals (D) from the shift register 421 are stored in data holding capacitors $C_1$, $C_2$, . . . to be uniformized with respect to time. Signals (E) from the transfer gate 422 as shown at (E) in FIG. 7 are respectively supplied to inverters $In_1$, $In_2$, . . . to generate a switching timing signal. More specifically, when the signal (E) from the transfer gate 422 is "H" (high level; indicating "1"), transistors $Tr_1$, $Tr_3$, . . . , $Tr_{2n-1}$ (n: number of signal lines) in the switching circuit unit 43 are selected to supply the "black" signal waveform (A) to a signal electrode, and when the signal (E) from the transfer gate 422 is "L" (low level, indicating "0"), transistors $Tr_2$, $Tr_4$, . . . , $Tr_{2n}$ in the switching circuit unit 43 are selected to supply the "white" signal waveform "F" to a signal electrode. The time-serial waveform applied to the signal line $D_1$ at this time is shown at D1 in FIG. 7.

FIG. 7 shows a timing chart for the above mentioned "black" signal waveform (A), "white" signal waveform (F), latch pulses (C), signals (D) from the shift register 421, signals (E) from the transfer gate 422, output signal D1 to the signal line $D_1$, scanning signals $S_1$, $S_2$, . . . , and basic clock signals.

Figure 8A:
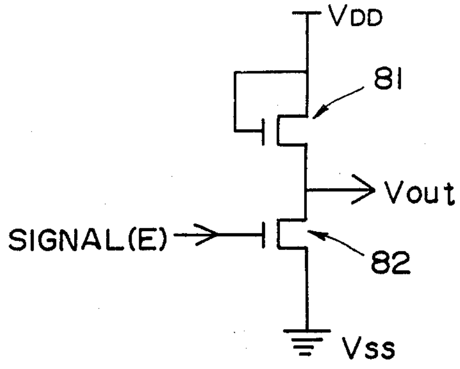
FIG. 8A is an equivalent circuit diagram of an inverter.
Figure 8B:
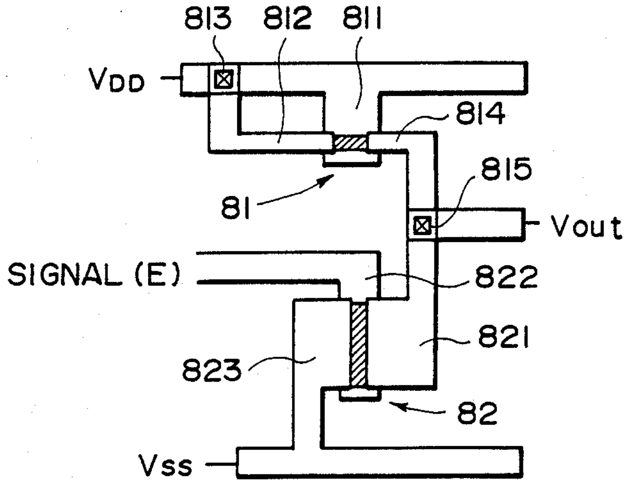
FIG. 8B is a plan view showing the layout thereof.
Figure 8C:
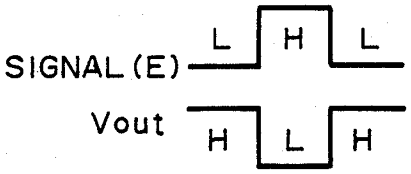
FIG. 8C illustrates input and output characteristics of the inverter.

FIG. 8A shows an equivalent circuit of a signal inverter 81 functioning as one of the inverters $In_1$, $In_2$, . . . ; FIG. 8B is a plan view showing the layout thereof; and FIG. 8C illustrates the relationships between the input and output of the circuit. In FIG. 8A, $V_{SS}$ denotes 0 volt (ground state), and $V_{DD}$ denotes a power supply voltage. In the inverter, an output signal (E) from the transfer gate 422 may be controlled by a load transistor 81 and a drive transistor 82 to provide a switching timing signal $V_{out}$. The load transistor 81 has a gate 811 and a source 812 which are short-circuited through a contact hole 813, and also a drain 814 which is connected with a source 82 of the drive transistor 82 through a contact hole 821.

The drive transistor 82 has a gate 822 to which a signal (E) is supplied, and a drain 823 connected to $V_{SS}$. The hatched portions in FIG. 8B comprise thin film semiconductors such as amorphous silicon, polysilicon, CdSe or ZnSe.

Figure 9:
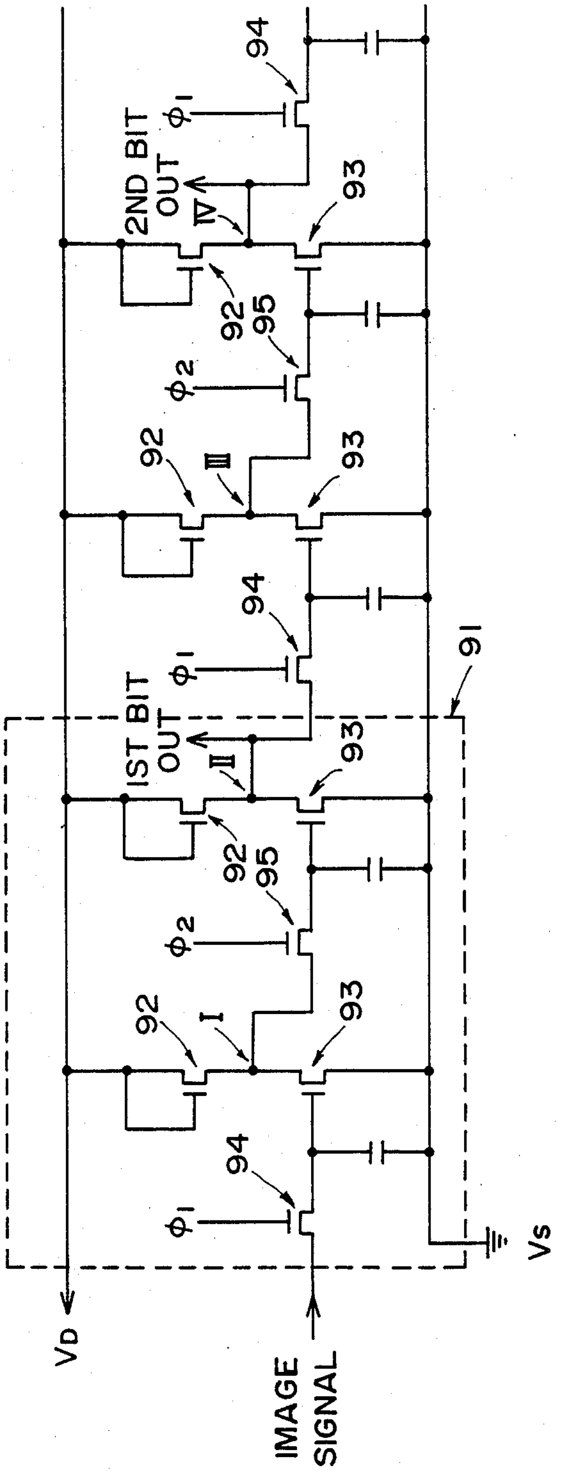
FIG. 9 is an equivalent circuit diagram of a dynamic shift register used in a driving apparatus of the invention.
Figure 10:
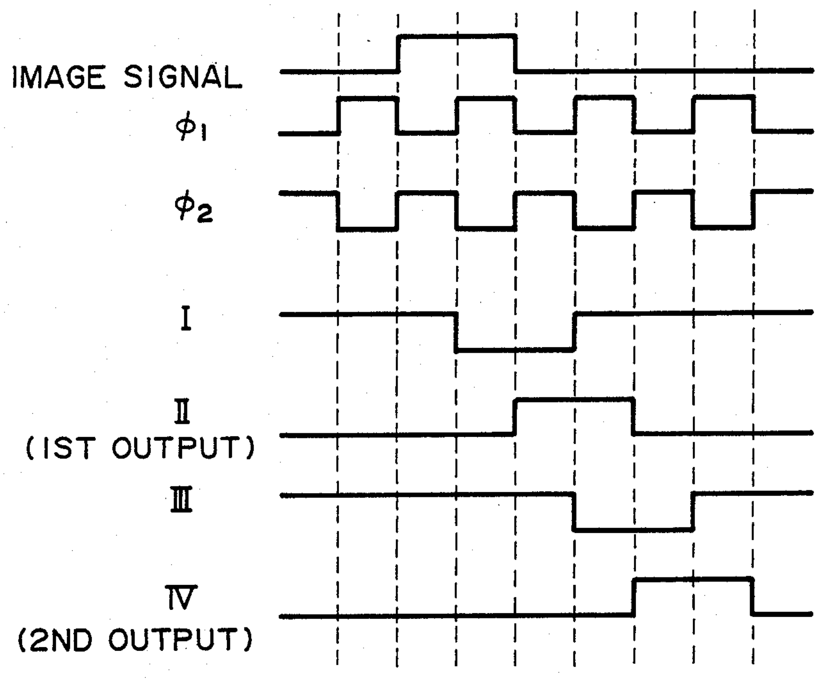
FIG. 10. is a time chart transfer.

FIG. 9 illustrates a preferred embodiment of the shift register 421 and shows a circuit of a dynamic shift register incorporating inverters. An image signal for example is supplied as an input signal. FIG. 10 shows a timing chart for the input signal, a clock signal $\phi_1$, a clock signal $\phi_2$, a signal at point I, a signal at point II (first stage output, corresponding to one denoted by "1st bit out"), a signal at point III, and a signal at point IV. FIG. 10 shows that the input pulse is shifted to a subsequent stage for each cycle of the clock signal $\phi$. The clock signal $\phi_1$ corresponds to one supplied from the clock 40, and the clock signal $\phi_2$ is one obtained by inverting it. In FIG. 9, a block surrounded by the dotted line denotes a first block 91 of the shift register, $V_D$ denotes a supply voltage, and $V_S$ denotes 0 volt (ground). A load transistor 92 and drive transistors 93, 94 and 95 in each block may comprise a thin film semiconductor such as amorphous silicon, polysilicon, CdSe, or ZnSe as a semiconductor.

In the driving apparatus according to the present invention, the transistors $Tr_1$, $Tr_2$, . . . used in the above mentioned switching circuit unit 43, the inverters $In_1$, $In_2$, . . . used in the switching control signal generating unit 42, and the transistors in the transfer gate 422 or the shift register 421 may be composed of MOS or MIS-FET transistors, and these transistors may be formed as thin film transistors on one glass substrate by using a semiconductor material such as amorphous silicon, polysilicon, CdSe or ZnSe. As a result, according to the present invention, a display apparatus having fewer parts and fewer connections may be prepared by forming the switching circuit unit 43, the switching signal generating unit 42, the "black" bus 413 and the "white" bus 414 on a single glass substrate constituting an FLC panel 21 and combining them with the "black" signal generating circuit 411, the "white" signal generating circuit 412 and the clock 40 as external circuits.

In the present invention, the operating frequency of the shift register 421 is definitely determined by the scanning frequency (frame frequency) of the panel 21 and the number of pixels, so that a dynamic shift register having less elements and adapted for a high speed operation is preferably used rather than a static shift register having many elements.

The present invention provides a driving apparatus of a simple circuit structure for a device to which a writing scheme using different polarities of voltage signals such as a positive polarity signal and a negative polarity signal is applied, particularly a ferroelectric liquid crystal device. As a result, the number of ICs used for the driving apparatus may be decreased, and the production cost of a display apparatus may be decreased.

Figure 11:
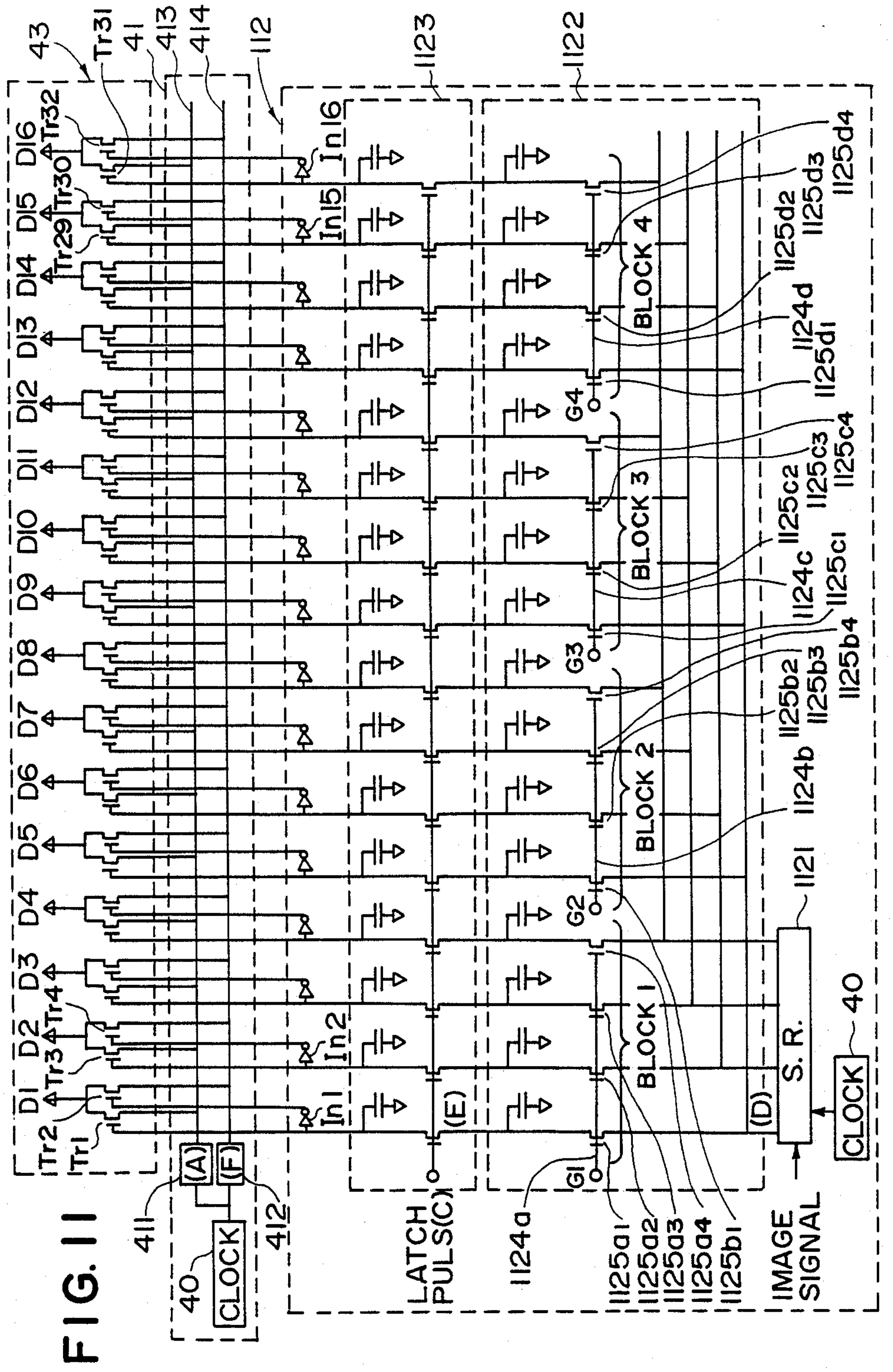
FIG. 11 is a block diagram illustrating another driving apparatus of the invention.

FIG. 11 shows another embodiment of the driving apparatus according to the present invention. The driving apparatus in FIG. 11 is particularly characterized by the switching control signal generating circuit 112. The switching control signal generating circuit comprises (a) a serial-parallel converter circuit and (b) a matrix circuit comprising a plurality of switching elements divided into a plurality of blocks, the switching elements in each block being commonly connected to a control line, the output signals from the serial-parallel converter circuit being distributed to the respective blocks.

More specifically, FIG. 11 is a block diagram of a driving apparatus for generating the above mentioned data signals $D_1$, $D_2$, . . . The driving apparatus comprises a drive signal generating unit 41 for generating a "white" signal W and a "black" signal B, which is substantially the same as the corresponding one in FIG. 4; a switching control signal generating unit 112; and a switching circuit unit 43 for selecting as a data signal either one of signals from a "black" bus 413 and a "white" bus 414, which is substantially the same as the corresponding one in FIG. 4.

The switching control signal generating unit 112 comprises a serial-parallel conversion circuit such as a shift register 1121 whereby input image signals are subjected to serial→parallel conversion to provide data signals (D) for one scan line as shown at (D) in FIG. 7; a matrix circuit 1122 for processing the data signals in a time-sharing manner; a buffer circuit such as a transfer gate circuit for making up or putting in order the output signals from the matrix circuit 1122; and inverter circuits $In_1$, $In_2$, . . .

The shift register 1121 may be a dynamic shift register as explained with reference to FIG. 9. The clock 40 in FIG. 11 is substantially the same as the clock 40 in FIG. 9.

Figure 12:
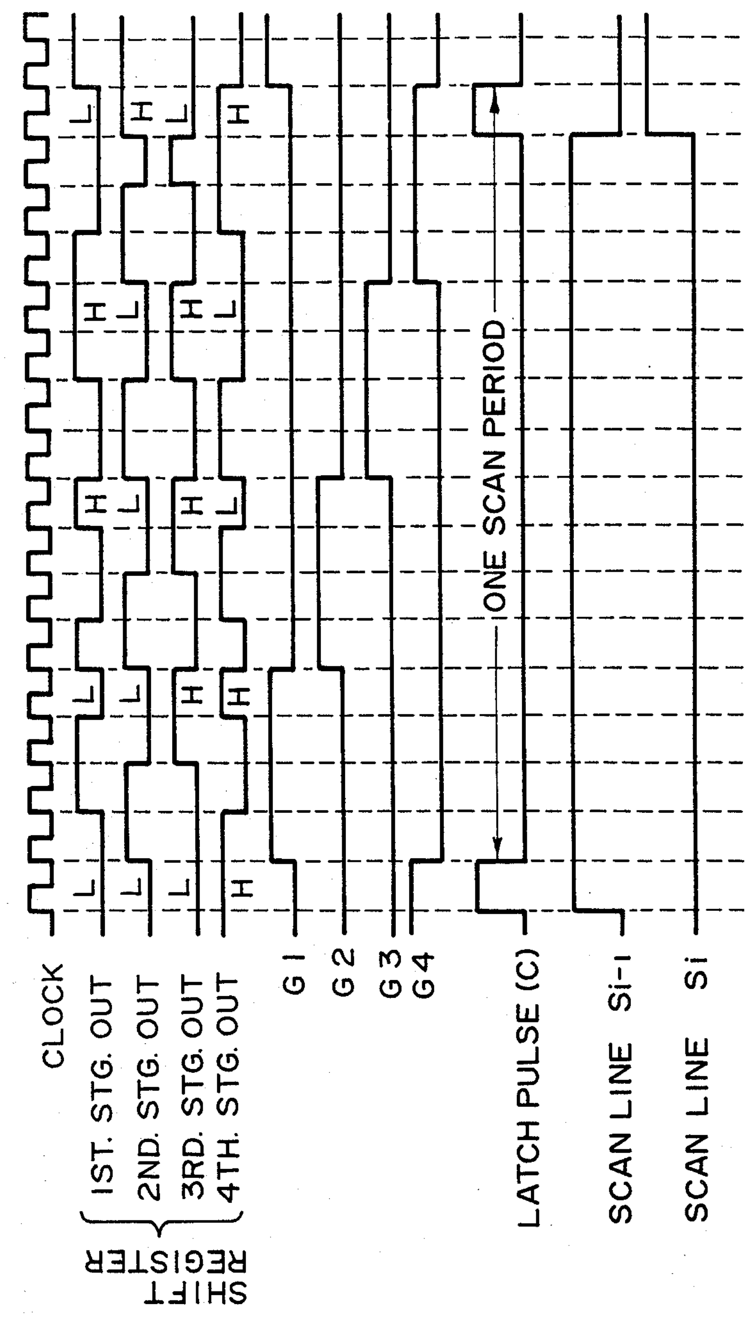
FIG. 12 is a time chart for a matrix circuit 1122 in the apparatus.

The matrix circuit 1122 used in the present invention will now be explained with reference to FIG. 11, and FIG. 12 showing a timing chart therefor. For brevity of the explanation, an embodiment is explained wherein the number of total bits on the signal side (the number of signal lines) n is 16 including $D_1$, $D_2$, . . . , $D_{16}$ and the number of divisions (number of blocks) is 4.

In the matrix circuit 1122, 16 bits are divided into 4 blocks (BLOCKs 1, 2, 3 and 4) each comprising 4 bits, and switching elements 1125 (1125a1–1125a4, 1125b1–1125b4, 1125c1–1125c4, and 1125d1–1125d4) are disposed corresponding to the respective bits so that they are connected in common for each block to one of control lines 1124 (**1124*a*, 1124*b*, 1124*c* and 1124*d***).

In the present invention, the above mentioned switching elements 1125 may be composed of MOS or MIS-field effect transistors, particularly thin film transistors, so that each of the control lines 1124 is commonly connected to the gates of related thin film transistors.

The sources of the switching transistor elements in each block are respectively connected to the output stages of the shift register 1121 so as to provide a matrix. For example, the first stage output line of the shift register 1121 is commonly connected to the transistor 1125a1 in Block 1, the transistor 1125b1 in Block 2, the transistor 1125c1 in Block 3 and the transistor 1125d1 in Block 4. In the same manner, the second, third and fourth output lines of the shift register 1121 are connected commonly to the transistors (1125a2, 1125b2, 1125c2 and 1125d2), (1125a3, 1125b3, 1125c3 and 1125d3) and (1125a4, 1125b4, 1125c4 and 1125d4), respectively, in the respective blocks. Further, as mentioned above, the gates of the transistors in each block are commonly connected to one of the control lines **1124*a*–1124*d*, to which gate-on pulses as shown at $G_1$, $G_2$, $G_3$ and $G_4$ in FIG. 12 are sequentially applied from the terminals $G_1$, $G_2$, $G_3$ and $G_4$, respectively. On the other hand, the drains of the switching transistors 1125** are respectively connected to the transfer gate circuit for each bit.

FIG. 12 is a timing chart for the respective signals, based on the clock signals 40, including the outputs of the shift register 1121, the gate-on pulses $G_1$, $G_2$, $G_3$ and $G_4$ to the control lines, a latch pulse, and the logical levels of an i−1-th and i-th scanning lines. In FIG. 12, "L" (low level) and "H" (high level) indicate the logical levels accompanying the switching during the period of selection of the i−1-th scanning line.

As shown in FIG. 12, a period from the selection of the scanning line $S_{i-1}$ to the selection of the subsequent scanning line Si is referred to as one horizontal scanning period (1H), and during the 1H-period, image signals for one scanning line are subjected to serial→parallel conversion and latched. For this purpose, the outputs of the shift register 1121 are allotted as shown in FIG. 12. In this instance, in a period of (1H/number of blocks), one control line $G_1$ is turned on in order to transfer a set of parallel signals (the 1st–4th stage output signals in the figure) into a block (Block 1 in FIG. 11). In the subsequent period (1H/number of blocks), the subsequent control line $G_2$ is turned on so as to transfer parallel signals from the shift register 1121 into a subsequent block. The above operation is repeated until the last block (Block 4 in the figure), and thereafter a latch pulse (C) is applied at the transfer gate circuit 1123. Through a series of operations as described above, timing signals corresponding to image signals for one scanning line are attained. A timing signal (E) as shown at (E) supplied from the transfer gate 1123 is supplied to inverters In1, In2, . . . each functioning as a control circuit for generating a switching signal. More specifically, when the signal (E) from the transfer gate 1123 is "H" (high level; indicating "1"), transistors $Tr_1$, $Tr_3$, . . . $Tr_{2n-1}$ (n number of signal lines) in the switching circuit unit 43 are selected to supply the "white" signal waveform (F) to signal electrodes, and when the signal (E) from the transfer gate 1123 is "L" (low level; indicating "0"), transistors $Tr_2$, $Tr_4$, . . . , $Tr_{2n}$ in the switching circuit unit 43 are selected to supply a "black" signal waveform (A) to signal electrodes. The time-serial waveform applied to the signal line $D_1$ at this time is shown at $D_1$ in FIG. 7.

FIG. 7 also shows a timing chart for the above mentioned "black" signal waveform (A), "white" signal waveform (F), latch pulses (C), signals (D) from the shift register 1121, signals (E) from the transfer gate 1123, output signal D1 to the signal line $D_1$, scanning signals $S_1$, $S_2$, . . . , and basic clock signals. The structures and function of the inverters $In_1$, $In_2$, . . . are substantially the same as explained with reference to FIGS. 8A–8F. In the inverter, an output signal (E) from the transfer gate 1123 may be controlled by a load transistor 81 and a drive transistor 82 as shown in FIG. 8 to provide a switching timing signal $V_{out}$. The load transistor 81 has a gate 811 and a source 812 which are short-circuited through a contact hole 813, and also a drain 814 which is connected with a source 82 of the drive transistor 82 through a contact hole 821.

The drive transistor 82 has a gate 822 to which a signal (E) is supplied, and a drain 823 connected to $V_{SS}$.

In the driving apparatus shown in FIG. 11, the transistors $Tr_1$, $Tr_2$, . . . used in the above mentioned switching circuit unit 43, the switching elements 1125 used in the matrix circuit 1122, the inverters $In_1$, $In_2$, . . . used in the switching control signal generating unit 112, and the transistors in the transfer gate 1123 or the shift register 1121 may be composed of MOS or MIS-FET transistors, and these transistors may be formed as thin film transistors on one glass substrate by using a semiconductor material such as amorphous silicon, polysilicon, CdSe or ZnSe. As a result, according to the present invention, a display apparatus having fewer parts and fewer connections may be prepared by forming the switching circuit unit 43, the switching signal generating unit 112, the "black" bus 413 and the "white" bus 414 on a single glass substrate constituting an FLC panel 21 and combining them with the "black" signal generating circuit 411, the "white" signal generating circuit 412 and the clock 40 as external circuits.

Further, in the driving apparatus shown in FIG. 11, it is also possible to form the switching circuit 43 and the switching control signal generating unit 112 on a single glass substrate and to connect them with a ferroelectric liquid crystal device by wire bonding or by using an anisotropic conductive adhesive.

In the above embodiment of the driving apparatus, an embodiment of the matrix circuit unit 1122 comprising 16 bits of signal lines divided into 4 blocks is explained. However, the number of signal lines and the number of blocks are not essentially restricted.

According to the present invention, the total number of switching transistors used in the signal driver circuit can be decreased. More specifically, as shown in FIG. 11, the switching circuit unit 43 includes 2 elements per signal line; the switching control signal generating unit includes two elements in one inverter; the transfer gate circuit 1123 includes one element per inverter; and the dynamic shift register include 6 elements for one output. Thus, 11 total switching transistor elements are included for one signal line where no block division of signal lines is included. Accordingly, if the cell shown in FIG. 2 comprises matrix electrodes wherein $m=n=1{,}000$, the signal line driver circuit requires $(2+2+1+6)\times 1000=1100$ elements, i.e., $11\times n$ switching transistors. In contrast thereto, in the present invention, if the n bit signal lines are divided into k blocks, the signal line driver circuit may be constituted by $6n\times(1+1/k)$ switching transistors. For example, $n=1000$ and $k=4$ in the above embodiment, so that only 7500 switching transistors in total are required. Moreover, the present invention provides a driving apparatus of a simple circuit construction adapted for a device to which a writing scheme using different polarity voltage signals inclusive of a positive polarity signal and a negative polarity signal is applied, particularly a ferroelectric liquid crystal device. As a result, the number of ICs used in the driving apparatus may be decreased, and the production cost of a display apparatus may be decreased.

What is claimed is:

1. A driving apparatus comprising a scanning driver circuit connected to scanning electrodes and a signal driver circuit connected to signal electrodes, said signal driver circuit comprising:

a drive signal generating unit comprising:

a first voltage output means associated with a first bus and second voltage output means associated with a second bus, each voltage output means comprising a positive voltage output circuit and a negative voltage output circuit;

means for supplying a first pulse and a second pulse shifted in phase from the first pulse, wherein the first pulse induces an output from the negative voltage output circuit of the first voltage output means and the positive voltage output circuit of the second voltage output means, wherein the second pulse induces an output from positive voltage output circuit of the first voltage output means and the negative voltage output circuit of the second voltage output means to thereby supply a first voltage signal comprising a preceding negative voltage and subsequent positive voltage to the first bus from the first voltage output means and to supply a second voltage signal comprising a preceding positive voltage and a subsequent negative voltage to the second bus from the second voltage output means, the polarities of the voltages being defined with respect to the ground level;

a switching circuit unit for selectively supplying the first or second voltage signal from the first or second bus to a signal electrode; and a switching signal generating unit for supplying a switching control signal to the switching circuit unit.

2. An apparatus according to claim 1, wherein said switching circuit unit comprises a transistor.

3. An apparatus according to claim 2, wherein the transistor in the switching circuit unit is a field effect transistor.

4. An apparatus according to claim 3, wherein said field effect transistor is a thin film transistor.

5. An apparatus according to claim 4, wherein said thin film transistor comprises a semiconductor film of amorphous silicon, polysilicon, CdSe or ZnSe.

6. An apparatus according to claim 1, wherein said switching signal generating circuit includes a serial-parallel conversion circuit, a buffer circuit and an inversion circuit.

7. An apparatus according to claim 6, wherein said serial-parallel conversion circuit is a dynamic shift register.

8. An apparatus according to claim 6, wherein said switching signal generating unit comprises a field effect transistor.

9. An apparatus according to claim 8, wherein said field effect transistor is a thin film transistor.

10. An apparatus according to claim 9, wherein said thin film transistor comprises a semiconductor film of amorphous silicon, polysilicon, CdSe or ZnSe.

11. A driving apparatus, comprising a signal driven circuit, for a display panel of the type comprising matrix electrodes formed by scanning electrodes and signal electrodes arranged to intersect with the scanning electrodes, wherein the contrast at each intersection of the scanning electrodes and the signal electrodes is discriminated depending on the direction of an electric field applied to th intersection, said scanning electrodes being connected to a scanning driver circuit and said signal electrodes being connected to a signal driver circuit; said apparatus comprising said signal drive circuit, and said signal driver circuit comprising:

a drive signal generating unit further comprising:

first voltage output means associated with a first bus and second voltage output means associated with a second bus, each voltage output means comprising a positive voltage output circuit and a negative voltage output circuit, means for supplying a first pulse and a second pulse shifted in phase from the first pulse, wherein the first pulse induces an output from the negative voltage output circuit of the first voltage output means and the positive voltage output circuit of the second voltage output means, wherein the second pulse induces an output from the positive voltage output circuit of the first voltage output means and the negative voltage output circuit of the second voltage output means, to thereby supply a first voltage signal comprising a preceding negative voltage and a subsequent positive voltage to the first bus from the first voltage output means and to thereby supply a second voltage signal comprising a preceding positive voltage and a subsequent negative voltage to tee second bus from the second voltage output means, the polarities of the voltages being defined with respect to the ground level;

a switching circuit unit for selectively supplying the first or second voltage signal from the first or second bus to a signal electrode; and a switching signal generating unit for supplying a switching control signal to the switching circuit unit.

12. An apparatus according to claim 11, which further comprises clock means for synchronizing said first and second voltage signals supplied from said signal driver circuit to the signal electrodes with a scanning selection signal supplied from said scanning driver circuit to a scanning electrode.

13. An apparatus according to claim 11, wherein the positive polarity voltage and the negative polarity voltage have the same amplitude.

14. An apparatus according to claim 11, wherein each of said first and second voltage signals comprise a voltage of a positive polarity, a voltage of a negative polarity and a voltage of the same level respectively with respect to a ground potential, and the first and second voltage signals are of mutually different phases.

15. An apparatus according to claim 14, wherein the positive polarity voltage and the negative polarity voltage have the same amplitude.

16. An apparatus according to claim 11, wherein said switching circuit unit comprises a transistor.

17. An apparatus according to claim 16, wherein the transistor in the switching circuit unit is a field effect transistor.

18. An apparatus according to claim 17, wherein said field effect transistor is a thin film transistor.

19. An apparatus according to claim 18, wherein said thin film transistor comprises a semiconductor film of amorphous silicon, polysilicon, CdSe or ZnSe.

20. An apparatus according to claim 11, wherein said switching signal generating circuit includes a serial-parallel conversion circuit, a buffer circuit and an inversion circuit.

21. An apparatus according to claim 20, wherein said serial-parallel conversion circuit is a dynamic shift register.

22. An apparatus according to claim 1, wherein said switching signal generating unit comprises a field effect transistor.

23. An apparatus according to claim 22, wherein said field effect transistor is a thin film transistor.

24. An apparatus according to claim 23, wherein said thin film transistor comprises a semiconductor film of amorphous silicon, polysilicon, CdSe or ZnSe.

25. An apparatus according to claim 1, wherein a ferroelectric liquid crystal is disposed at the intersections of the scanning electrodes and the signal electrodes.

26. An apparatus according to claim 25, wherein said ferroelectric liquid crystal is a chiral smectic liquid crystal.

27. An apparatus according to claim 26, wherein said chiral smectic liquid crystal is disposed in a layer thin enough to release the helical structure inherent to the chiral smectic liquid crystal in the absence of an electric field.

28. A driving apparatus comprising a scanning driver circuit connected to scanning electrodes and a signal driver circuit connected to signal electrodes, said signal driver circuit comprising:

(1) a drive signal generating unit which includes a first signal generating circuit and a second signal generating circuit for generating a first voltage signal and a second voltage signal, respectively, comprising mutually different polarity waveforms at a corresponding phase;

(2) a switching control signal generating unit including (a) a serial-parallel conversion circuit, and (b) a matrix circuit which includes a plurality of switching elements divided into a plurality of blocks, the switching elements in each block being commonly connected to a control line, the output signals from the serial-parallel conversion circuit being distributed to the respective blocks; and (3) a switching circuit unit for selectively supplying the first or second voltage signal to a signal electrode depending on a switching control signal supplied form the switching control signal generating unit.

29. An apparatus according to claim 28, wherein said switching control signal generating unit includes (a) the serial-parallel conversion circuit, (b) the matrix circuit, and (c) a buffer circuit.

30. An apparatus according to claim 28, wherein said switching control signal generating unit includes (a) the serial-parallel conversion circuit, (b) the matrix circuit, (c) a buffer circuit, and (d) an inversion circuit.

31. An apparatus according to claim 29, wherein said serial-parallel conversion circuit comprises a dynamic shift register.

32. An apparatus according to claim 31, wherein said dynamic shift register comprises a field effect transistor.

33. An apparatus according to claim 32, wherein said field effect transistor is a thin film transistor.

34. An apparatus according to claim 33, wherein said thin film transistor comprises a semiconductor film of amorphous silicon, polysilicon, CdSe or ZnSe.

35. An apparatus according to claim 28, wherein said switching elements respectively comprise a field effect transistor.

36. An apparatus according to claim 35, wherein said field effect transistor is a thin film transistor.

37. An apparatus according to claim 36, wherein said thin film transistor comprises a semiconductor film of amorphous silicon, polysilicon, CdSe or ZnSe.

38. An apparatus according to claim 28, wherein said first and second voltage signals are supplied to their exclusive buses respectively from the drive signal generating unit.

39. A driving apparatus, comprising a signal driver circuit for a display panel of the type comprising matrix electrodes formed by scanning electrodes and signal electrodes arranged intersect with the scanning electrodes wherein a contrast at each intersection of the scanning electrodes and the signal electrodes is discriminated depending on the direction of an electric field applied to the intersection, said scanning electrodes being connected to a scanning driver circuit and said signal electrodes being connected to said signal driver circuit, said signal driver circuit comprising:

(1) a drive signal generating unit which includes a first signal generating circuit and a second signal generating circuit for generating a first voltage signal and a second voltage signal, respectively, comprising mutually different polarity waveforms at a corresponding phase;

(2) a switching control signal generating unit including (a) a serial-parallel conversion circuit, and (b) a matrix circuit which includes a plurality of switching elements divided into a plurality of blocks, the switching elements in each block being commonly connected to a control line, the output signals from the serial-parallel conversion circuit being distributed to the respective blocks; and (3) a switching circuit unit for selectively supplying the first or second voltage signal to a signal supplied from the switching control signal generating unit.

40. An apparatus according to claim 39, which further comprises clock means for synchronizing said first and second voltage signals supplied from said signal driver circuit to the signal electrodes with a scanning selection signal supplied from said scanning driver circuit to a scanning electrode.

41. An apparatus according to claim 39, wherein each of said first and second voltage signals comprises a voltage of a positive polarity and a voltage of a negative polarity with respect to a ground potential, and the first and second voltage signals have mutually different phases.

42. An apparatus according to claim 41, wherein the positive polarity voltage and the negative polarity voltage have the same amplitude.

43. An apparatus according to claim 41, wherein said first and second voltage signals are of mutually opposite phases.

44. An apparatus according to claim 39, wherein each of said first and second voltage signals comprises a voltage of a positive polarity, a voltage of a negative polarity and a voltage of the same level respectively with respect to a ground potential, and the first and second voltage signals are of mutually different phases.

45. An apparatus according to claim 44, wherein the positive polarity voltage and the negative polarity voltage have the same amplitude.

46. An apparatus according to claim 39, wherein said switching control signal generating unit includes (a) the serial-parallel conversion circuit, (b) the matrix circuit, and (c) a buffer circuit.

47. An apparatus according to claim 39, wherein said switching control signal generating unit includes (a) the serial-parallel conversion circuit, (b) the matrix circuit, (c) a buffer circuit, and (d) an inversion circuit.

48. An apparatus according to claim 46, wherein said serial-parallel conversion circuit comprises a dynamic shift register.

49. An apparatus according to claim 48, wherein said dynamic shift register comprises a field effect transistor.

50. An apparatus according to claim 49, wherein said field effect transistor is a thin film transistor.

51. An apparatus according to claim 50, wherein said thin film transistor comprises a semiconductor film of amorphous silicon, polysilicon, CdSe or ZnSe.

52. An apparatus according to claim 39, wherein said switching elements respectively comprise a field effect transistor.

53. An apparatus according to claim 52, wherein said field effect transistor is a thin film transistor.

54. An apparatus according to claim 53, wherein said thin film transistor comprises a semiconductor film of amorphous silicon, polysilicon, CdSe or ZnSe.

55. An apparatus according to claim 39, wherein a ferroelectric liquid crystal is disposed at the intersections of the scanning electrodes and the signal electrodes.

56. An apparatus according to claim 55, wherein said ferroelectric liquid crystal is a chiral smectic liquid crystal.

57. An apparatus according to claim 56, wherein said chiral smectic liquid crystal is disposed in a layer thin enough to release the helical structure inherent to the chiral smectic liquid crystal in the absence of an electric field.

* * * * *

UNITED STATES PATENT AND TRADEMARK OFFICE
CERTIFICATE OF CORRECTION

PATENT NO. : 4,830,467

DATED : May 16, 1989

INVENTOR(S) : HIROSHI INOUE ET AL.

It is certified that error appears in the above-identified patent and that said Letters Patent is hereby corrected as shown below: Title page:

AT [56] REFERENCES CITED

Foreign Patent Documents, "1070532 4/1986 Japan" should read --61-70532 4/1986 Japan--.

SHEET 11 OF 13

Fig. 11, "LATCH PULS(C)" should read --LATCH PULSE(C)--.

COLUMN 2

Line 3, "above mentioned" should read --above-mentioned--.

COLUMN 3

Line 8, "G(SmC*)-phase" should read --G(SmG*)-phase--.
Line 54, "being" should be deleted.
Line 57, "of" should be deleted.

COLUMN 4

Line 59, "an $S_1$-$D_1$" should read --an $S_1$-$D_1$ intersection--.

COLUMN 6

Line 33, "serial-paral-" should read --serial → paral- --.

UNITED STATES PATENT AND TRADEMARK OFFICE

CERTIFICATE OF CORRECTION

PATENT NO. : 4,830,467

DATED : May 16, 1989

INVENTOR(S) : HIROSHI INOUE ET AL.

It is certified that error appears in the above-identified patent and that said Letters Patent is hereby corrected as shown below:

COLUMN 7

Line 7, "source 82" should read --source 821--.
Line 55, "less" should read --fewer--.

COLUMN 9

Line 38, "(n num-" should read --n: num- --.
Line 62, "source 82" should read --source 821--.

COLUMN 10

Line 41, "(2+2+1+6)X1000=1100 elements," should read --(2+2+1+6)X1000=11,000 elements,--.
Line 64, "a" (first occurrence) should be deleted.

COLUMN 11

Line 7, "positive" should read --the positive--.
Line 10, "means" should read --means,--.
Line 58, "th" should read --the--.
Line 61, "drive" should read --driver--.

COLUMN 12

Line 16, "tee" should read --the--.
Line 61, "claim 1," should read --claim 11,--.

COLUMN 13

Line 34, "form" should read --from--.

UNITED STATES PATENT AND TRADEMARK OFFICE

CERTIFICATE OF CORRECTION

PATENT NO. : 4,830,467

DATED : May 16, 1989

INVENTOR(S) : HIROSHI INOUE ET AL.

It is certified that error appears in the above-identified patent and that said Letters Patent is hereby corrected as shown below:

COLUMN 14

Line 1, "intersect" should read --to intersect--.
Line 24, "signal sup-" should read --signal electrode depending on a switching control signal sup- --.

Signed and Sealed this

Twelfth Day of June, 1990

*Attest:*

HARRY F. MANBECK, JR.

*Attesting Officer*

*Commissioner of Patents and Trademarks*